I. RIDER.
Car Starter and Brake.
No. 87,068.                                                                 Patented Feb. 16, 1869.
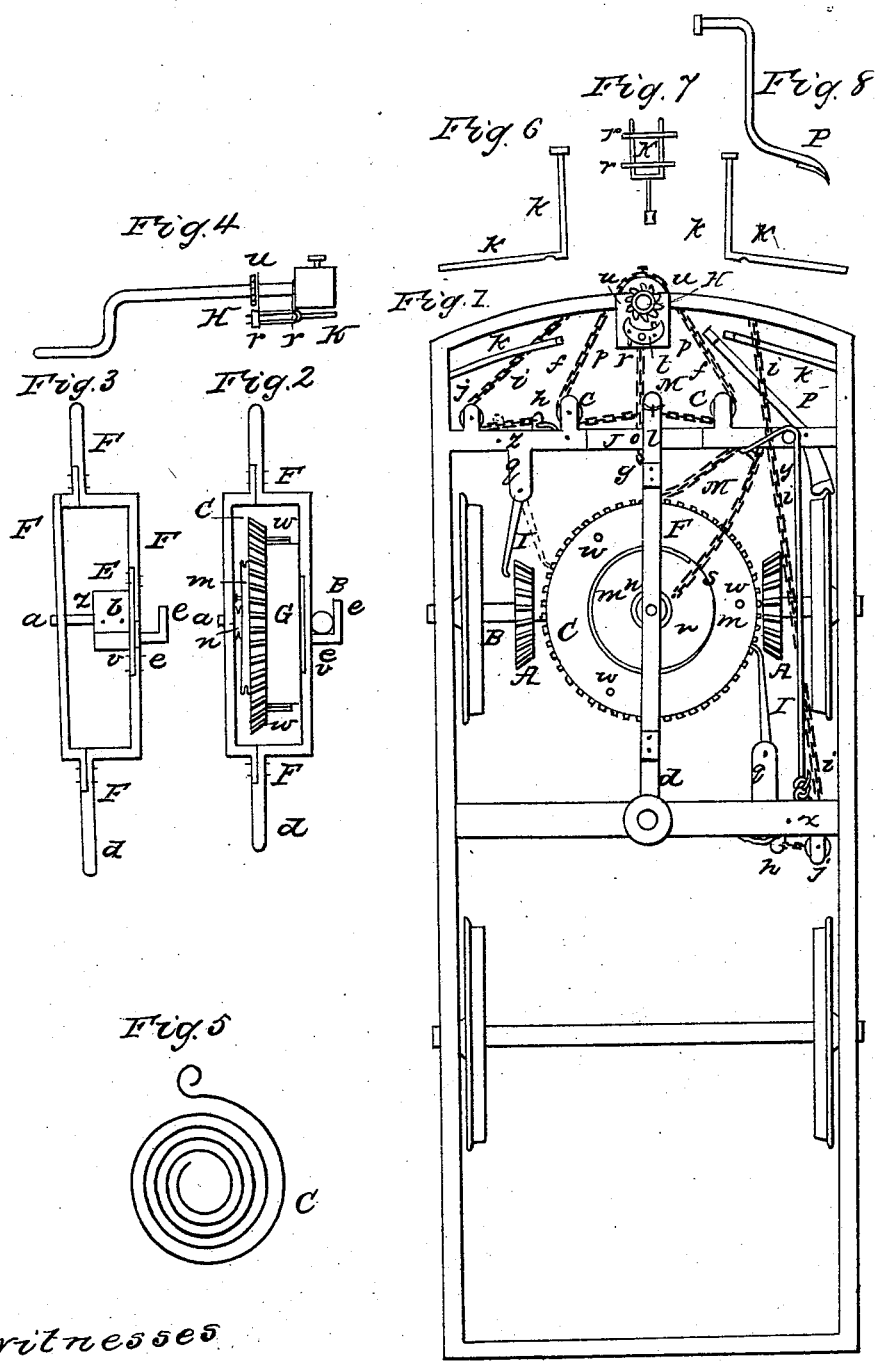

UNITED STATES PATENT OFFICE.

ISAIAH RIDER, OF INDIANAPOLIS, INDIANA.

IMPROVED CAR BRAKE AND STARTER.

Specification forming part of Letters Patent No. 87,068, dated February 16, 1869.

*To all whom it may concern:*

Be it known that I, ISAIAH RIDER, of Indianapolis, in the county of Marion and State of Indiana, have invented new and useful Improvements in Car Brakes and Starters; and I do hereby declare that the following is a full, clear, and exact description of the same, reference being had to the accompanying drawings, making part of this specification.

My invention relates to stopping and starting cars, and is designed to retain the momentum or force required to stop the car, and use this same force in starting it again.

This design is accomplished by means of a coiled spring and gearing attached to the car, and operated in such a manner, hereinafter explained, that the momentum of the car is expended in coiling up a spring, which stops the car, and the force is retained in the spring till desired to be used, when the spring is allowed to unwind, and is made to expend its force in starting the car and sending it forward.

Figure 1 represents the lower or running part of a car with my invention attached. Fig. 2 represents a side view of the center wheel, with its grooved rims and its pins, in combination with the coiled spring and with the lever and the hook or clasp around the axle B. Fig. 3 represents a side view of the lever and its center, with its center-pin and rim, around which the spring winds, and the hook for holding the lever to the axle. Fig. 4 represents a side view of the crank with its ratchet-wheel attached, and fork K. Fig. 5 represents the coiled spring C. Fig. 6 represents the foot or hand levers for moving the pawl-levers I I. Fig. 7 represents the fork which throws the pawl t out of its ratchet-wheel u, and the positions of the plates r r. Fig. 8 represents the foot-brake N.

The following description will enable any one skilled in the art to make and use my invention.

A A represent cog-wheels fastened firmly to the axle B. C represents a large cog-wheel, which is placed in a horizontal position over the axle B, with cogs so made and arranged as to be made to fit into the cogs of wheels A A, and is fastened to the center E, around the pin a of which it revolves.

The center casting E has, besides the pin a, a rim, b, to which the inside end of the spring G is attached, and around which it is coiled, and a plate, v, for attaching it to the lever F, and a hook or clasp, e, to hold it to the axle B, preventing it from moving up or down.

The wheel C has a center, which is fitted to the pin a, and slides down over it to the plate v, on which it rests.

A tight chamber, z, is formed around the pin a by the rim b and plate v, for oil for the pin a and center of the wheel C.

The coiled spring G is made like a clock-spring, and one end is attached to the center rim, b, and the other end to the wheel C near its periphery. The center E is firmly attached to the lever F.

The lever F may be made in two parts, and the top piece be fastened to the bottom, after the spring and wheel have been put onto the center.

The lever F has wide bearings at the end d, and is fastened to the car-box by a bolt, or in such a manner as to prevent it from any rolling movement. The hook or clasp e does not prevent the center from moving sidewise, but only from moving up and down with the car-box.

The lever F is moved sidewise, sliding the clasp e on the axle B, and throwing the wheels into and out of gear on one side and the other by means of ropes or chains f f, fastened in the end l of the lever, and running around pulleys c c, and fastened to the lower part of the crank H, which the brakeman turns one way to stop and the other way to start the car.

The pawl-levers I I are made to catch into the cogs of the wheel C and hold it, so as to prevent the spring G, when coiled up, from running the car backward or unwinding till it has been thrown across and the cogs of the wheels are engaged on the opposite side.

When the wheel C is being thrown across, and just as the cogs begin to engage on the opposite side, the pawl-lever I (which holds the wheel from unwinding) strikes its pin x, and is thrown out of the cog-wheel C, when the spring is allowed to unwind and spend its force in starting the car and sending it forward.

The pins x x may be placed on either side of the fulcrum-pins q q, but should be placed so as to strike the levers I I near the ends of the levers.

The levers I I are thrown into engagement with the cogs of the wheel C by the ropes or chains $i\ i$, pulleys $j\ j$, and levers $k\ k$, which levers may be operated by the feet or hands.

The levers I I are kept from the cogs, when not holding the wheel C, by means of india-rubber straps $h\ h$, or other springs.

Upon the center wheel, C, are cast two grooved rims, $m\ n$, one near the center and the other near the periphery of the wheel, with a notch cut into it vertically, and so made on one side and so arranged that when the wheel is so turned as to unwind the spring (more than till the chain M is unwound from small rim $n$) it will catch the rope or chain M and wind it around the large grooved rim $m$; but the rim is beveled on the other side, so that the rope or chain will not catch in the large rim $m$, but will be wound around the small rim $n$, which is the width of the rim $m$ above it.

The slack rope or chain M is kept tight by the india-rubber strap $y$, or other spring, so that, on the spring G being unwound, the rope does not pull on the large rim $m$ until after the force of the spring has been expended in unwinding, and the wheel begins to unwind the spring more than to its natural position when free from the cogs and pawls.

One end of the slack rope M is fastened inside of the rim $m$, near the notch in it, and the slack rope kept so pulled by the india-rubber strap $y$ that the rope will always catch in the large rim $m$ whenever the wheel C is turned enough to unwind the spring any beyond being unwound from the small grooved rim $n$, but never catch it otherwise. The other end of the rope or chain is attached to the fork K.

The rope or chain passes through the lever F, near the end at $g$, and the cross-bar J at $o$, at the center opposite the handle of the fork K, and when the wheel is free the slack rope is taken up on the large rim $m$.

The fork K passes through large holes P P in the plates $r\ r$, and both prongs are fastened to the pawl $t$, which pawl is fastened at its center, and is so made at both ends as to catch into the ratchet-wheel $u$, and hold it whenever the ratchet-wheel is turned either way and the pawl $t$ thrown into it. The ratchet-wheel is so made as to fit the pawl $t$ for the above purpose. The fork K is allowed to turn with the pawl $t$ in the holes P P, which holes are even on the back part of the lower plate, which plate forms the fulcrum for the fork K when pulled upon by the rope M.

Whenever the wheel C is turned so as to wind up the spring, the slack rope M is unwound from rim $m$ and wound around rim $n$ till the car is stopped, and in unwinding from rim $n$ it does not catch in the notch in the rim $m$ till it is unwound from the small rim $n$; but whenever the rope or chain M is unwound, or the wheel is commenced to be wound in the wrong direction, the rope already being wound around the large rim $m$, and the slack rope being taken up at once, the rope or chain pulls on the fork-handle K, and draws back the foremost side of the fork and end of the pawl even with the other side and end, and thus throws the pawl out of the ratchet, and the rope, passing through the bar J and lever F, throws the lever into the center of the car, and the wheels out of gear from either side. Thus the spring is protected from injury by being wound up in the wrong way, or from exerting any force in the opposite direction, if left in gear, after it has expended its force in starting the car.

P represents a foot-brake, which is a lever, so fastened that one end may be stepped on by the brakeman, while the other bears against the wheel of the car, to check it in downhill grades, where the spring is not needed to be used, but only this foot-lever friction-brake.

The cog-wheels may be made straight-faced or be beveled, and may be arranged so that wheels A A will be little wider apart than the diameter of the wheel C, and the tops of equal height with it, and the wheels be thrown into gear by moving the lever F; or, if the wheels are beveled, the wheels A A may be as wide apart as the diameter of the wheel C, and the wheel C be placed a little above the wheels A A, and so fastened at the center as to allow the wheels to be thrown into and out of gear by pressing down upon one side of the wheel C, over one of the wheels A A, and then upon the other side with levers, upon the ends of which levers casters may be placed, to avoid friction; but the arrangement illustrated by the drawing is thought to be more practicable.

If, for any purpose, it may be necessary to have two applications of the invention to the same car, one can be applied to one axle and end of the car and the other to the other axle and end of the car, and both may be operated from either end of the car by having both in their several parts united, so that operating one part at one end operates the corresponding part the same at the other end.

When the car is turned around, and the same end is always kept forward, the crank H is always turned in the same way to stop the car, and only one and the same pawl-lever I is used; but when the car is not turned round in going in opposite directions, the crank H is turned in one way in going one direction, and the other way in going the other direction, to stop the car, and also one pawl I is used one way, and other pawl I in the opposite direction, but always the pawl-lever on the side where the cogs engage is used.

Having thus fully described my invention, and mode of operating it, what I claim as new, and desire to secure by Letters Patent, is—

1. The bevel cog-wheel C, in combination with the coiled spring G, thereto attached in the manner described, when hung in the lever F, furnished with the hook $e$, and arranged to operate in a horizontal plane over the axle B, and in connection with cog-wheels A A, substantially as and for the purpose set forth.

2. In combination with the subject-matter of the above claim, the arrangement of the chains $ff$, pulleys C C, and crank H, ratchet-wheel $u$ and pawl $t$, substantially as and for the purpose set forth.

3. The lever-pawls I I, pins $x\ x$, cords $i\ i$, pulleys $jj$, foot-levers $k\ k$, and springs $h\ h$, arranged and operating substantially as and for the purpose set forth.

4. The arrangement of chain M, in combination with the elastic cord or spring $y$, grooved rims $m$ and $n$ on wheel C, fork K, plates $r\ r$, pawl $t$, and ratchet-wheel $u$ on crank H, substantially as and for the purpose set forth.

ISAIAH RIDER.

Witnesses:
   JNO. R. ASHER,
   GEO. F. ACKERT.